HENSON & ROHR.

Fertilizer.

No. 10,572.  Patented Feb. 28, 1854.

UNITED STATES PATENT OFFICE.

THOMAS D. HENSON AND GEORGE ROHR, OF CHARLESTOWN, VIRGINIA.

IMPROVEMENT IN SEED-PLANTERS.

Specification forming part of Letters Patent No. 10,572, dated February 28, 1854.

*To all whom it may concern:*

Be it known we, THOMAS D. HENSON and GEORGE ROHR, of Charlestown, in the county of Jefferson and State of Virginia, have invented and made certain new and useful Improvements on the Hopper and Feeding Apparatus of Compost-Distributers or Fertilizing-Machines; and we do hereby declare that the following is a full, clear, and exact description of the method of construction and mode of operating the same, reference being had to the accompanying drawings, making a part of this specification, in which—

Figure 1:
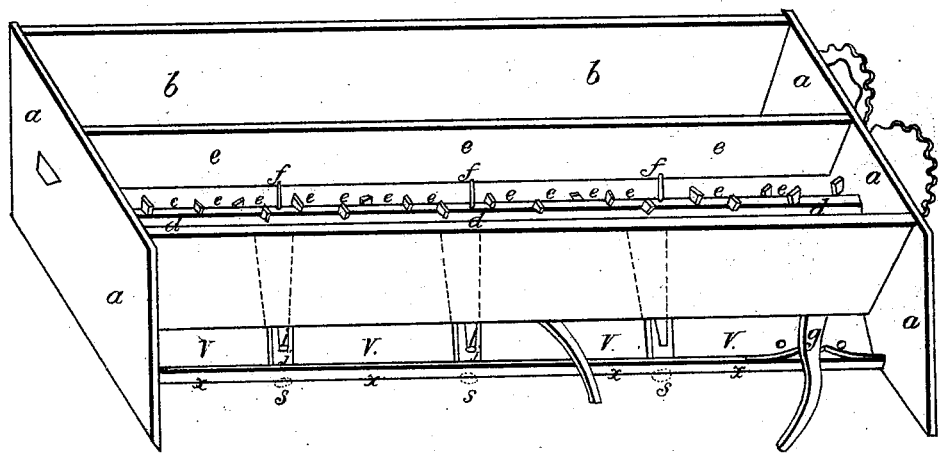

Figure 1 is a perspective view of the improved combined seeding-machine or compost apparatus. *a a a a* show the double fountain or hopper arrangement; *b b*, the seeding-fountain; *c c*, the compost or fertilizing hopper; *d d d*, the double-acting spiral-like feeding-shaft, with its double obliquely-arranged compost-beaters *e e e*; *f f f*, the vent-cleaning spikes; *g*, the feed-stop-lever handle; *h h*, the cog-gearing; *i i i*, the compost-spouts; *j j j*, the grain-feeding troughs or channels, connected to and projecting from the grain-feeding chamber or hopper *b b*; *k*, the lever-handle of the compost shut-off; *o o*, the holdfast-rest of the lever-handle. *s s s* show the vents or outlets through the apron or trough-rest *v v v v v*. *x x x x* is a flanged edge or rim attached to the apron.

Figure 2:
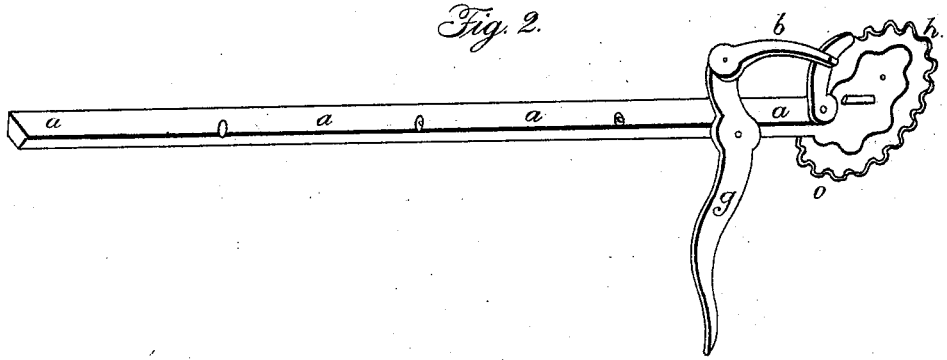

Fig. 2, *a a a* is the grain or feed regulating apparatus detached, showing the grain-vents *s s s*, the scalloped-like gear-wheel *h o* for reciprocating the longitudinal feeding slide-piece *a a a*; *d*, the pinion or the axis of the gear-wheel; *g b c*, the combination device, or double-jointed lever, for throwing the feeding slide piece or bar in or out of action.

To enable others to be skilled in the use and application of our invention and improvements, we will proceed to describe the construction and operation thereof, the nature and principles of which consist in having a double-hopper arrangement, Fig. 1, so as to be readily attached to any grain-seeding apparatus, said hopper having two or more compartments for the double purpose of holding a supply of grain and a supply of compost matter. In the compartment *c c* is arranged a revolving shaft, *d d d*, having two series of obliquely-arranged beaters, *e e e e*, and cleaning-spikes *f f f*. These beaters and spikes extend nearly in close contact with the concave bottom *w w*, Fig. 1, in which bottom, at equal distances, are compost outlets or vents immediately over the spouts *i i i*. These vents are closed up when required (to prevent the escape of the compost) by a sliding cut-off-valve arrangement with lever-handle *k*, or by any other equivalent. The series of double beaters *e e e*, because of their presenting two inward oblique surfaces, feed inwardly, thereby causing the compost matter to tend toward the vents or outlets over the spouts *i i i i*, both from the right and left, or inward from the ends of the fountain, so that no residue of compost is detained or permitted to lodge in the concave bottom.

It will be observed that the beaters or scrapers *e e e e* entirely prevent the compost matter from being carried solely in one direction, and heaping up, or in part only escaping or flowing out. The spikes *f f f* revolve immediately over the vents in the concave bottom, and perform the important duty of cleaning or keeping open the vents, and keeping them free from choking or filling up.

In the hopper *b b* is deposited the seed or grain, which is caused to feed into the spout-troughs or grain-guides *j j j*, Fig. 1, by the reciprocating or graduating feed-bar *a a a*, Fig. 2, having small gutters *s s s*, arranged so as to come opposite to corresponding outlets or holes cut into the divisional board *c c c*, Fig. 1.

The operation of the machine is produced by the gearing *h h*, Figs 1, 2, said gearing being acted on or set in motion by the driving-wheel of the machine, the gearing *h h*, all being connected to the double hopper *a a a a*, Fig. 1, the scalloped gear-wheel *h o*, having its axis inserted into the end of the grain-hopper *b b*, Fig. 1, so as to admit of a reciprocating motion being communicated to the graduating feed-bar, by the aid of the combination, or compound-acting lever device *g b c*, Fig. 2.

It will be observed that the grain discharges from hopper *b b* in the direction through the troughs or gutters indicated by the double rows of dots, Fig. 1. The compost falls or flows through the bottom of the hopper *c c*, passing through the spouts *i i i*, and then the grain and compost mingle together and pass out through the same openings or outlets in the flanged edge *x x x*, at the places indicated by the circle of dots s s s, Fig. 1, the grain and compost passing down the hollow of the usual furrow-spouts, and are deposited into one common furrow simultaneously, and as desired.

Now, having fully described our improvements in seeding and compost apparatus, what we claim as new and original with us, and desire to secure by Letters Patent of the United States, is as follows:

The construction, use, and application of a revolving longitudinal shaft having series of right and left or double obliquely-set beaters e e e, and cleaning spikes f f f f, Fig. 1, for the purpose as specified.

THOMAS D HENSON.
GEORGE ROHR.

Witnesses:
HIRAM O. BANNON,
SAM. C. YOUNG.